United States Patent [19]
Witt

[11] Patent Number: 5,944,815
[45] Date of Patent: Aug. 31, 1999

[54] MICROPROCESSOR CONFIGURED TO EXECUTE A PREFETCH INSTRUCTION INCLUDING AN ACCESS COUNT FIELD DEFINING AN EXPECTED NUMBER OF ACCESS

[75] Inventor: David B. Witt, Austin, Tex.

[73] Assignee: Advanced Micro Devices, Inc., Sunnyvale, Calif.

[21] Appl. No.: 09/005,811

[22] Filed: Jan. 12, 1998

[51] Int. Cl.[6] .................................................... G06F 9/00
[52] U.S. Cl. ............................................................ 712/207
[58] Field of Search ............................... 395/383; 712/207

[56] References Cited

U.S. PATENT DOCUMENTS

| 5,761,468 | 6/1998 | Emberson | 712/207 |
| 5,813,041 | 9/1998 | McIntyre, Jr. et al. | 711/167 |
| 5,875,482 | 2/1999 | McIntyre, Jr. et al. | 711/167 |

OTHER PUBLICATIONS

"PowerPC: Microprocessor Developer's Guide", Sams Publishing, Indianapolis, Indiana, 1995, pp. 212–213.

*Primary Examiner*—Zarni Maung
*Assistant Examiner*—Kenneth R. Coulter
*Attorney, Agent, or Firm*—Conley, Rose & Tayon; Lawrence J. Merkel; B. Noel Kivlin

[57] ABSTRACT

A microprocessor is configured to execute a prefetch instruction including an access count field defining an access count corresponding to a cache line identified by the prefetch instruction. The access count indicates a number of accesses expected to the cache line. The microprocessor attempts to retain the cache line until at least the number of accesses specified by the access count are recorded. Effectively, a "lifetime" for the cache line to be stored in the cache is specified. The lifetime indicates not only how long the cache line should be retained in the cache (in terms of the number of cache accesses), but also more accurately indicates the time at which the cache line can be removed from the cache (i.e. upon expiration of the access count). In one embodiment, a prefetched cache line and the corresponding access count are stored in a data cache within the microprocessor. The stored access count is decremented upon access to the cache line. The data cache attempts to allocate storage for a cache miss in a manner which does not displace the prefetched cache line at least until the corresponding access count expires. The present embodiment may additionally include a victim cache for storing prefetched cache lines which are selected by the data cache for replacement prior to expiration of the corresponding access count.

20 Claims, 5 Drawing Sheets

MICROPROCESSOR CONFIGURED TO EXECUTE A PREFETCH INSTRUCTION INCLUDING AN ACCESS COUNT FIELD DEFINING AN EXPECTED NUMBER OF ACCESS

BACKGROUND OF THE INVENTION

1. Field of the Invention

This invention is related to the field of microprocessors and, more particularly, to prefetch instructions within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the effective memory latency. Cache misses require the access to receive data from the main memory, thereby increasing the effective memory latency.

In many performance critical applications, large data sets are manipulated. For example, floating point intensive applications often operate upon two or three dimensional arrays holding 4 to 20 megabytes of data. A repetitive set of operations may be performed upon the elements within the arrays, generating a fixed number of references to each datum (after which the datum may not be accessed for a relatively long period of time). Accordingly, it would be desirable to store the data being referenced in registers until the fixed number of references are performed, then discard that data in favor of the next data to be referenced. If enough registers are available to the compiler, code may be generated in this manner. Unfortunately, when the number of registers available for storing the data is limited (e.g. in the x86 architecture), the data often cannot be held in the registers until the fixed number of accesses occur. Furthermore, the data set being operated upon (e.g. 4 to 20 megabytes) is substantially larger than the typical cache size included in microprocessors. Data may be overwritten within the cache prior to occurrence of the fixed number of references to that data. Still further, after the last access to the data, data may be retained in the cache while other, less recently accessed data is replaced. Accordingly, cache misses and long memory latencies may be regularly experienced by these performance critical applications, thereby reducing performance of the microprocessor when executing these applications.

SUMMARY OF THE INVENTION

The problems outlined above are in large part solved by a microprocessor configured to execute a prefetch instruction in accordance with the present invention. The prefetch instruction includes an access count field defining an access count corresponding to a cache line identified by the prefetch instruction. The access count indicates a number of accesses expected to the cache line. The microprocessor attempts to retain the cache line until at least the number of accesses specified by the access count are recorded. Advantageously, a "lifetime" for the cache line to be stored in the cache is specified. The lifetime indicates not only how long the cache line should be retained in the cache (in terms of the number of cache accesses), but also more accurately indicates the time at which the cache line can be removed from the cache (i.e. upon expiration of the access count). Cache hit rates may be increased by (i) the prefetch of data, (ii) the retention of data through a specified number of accesses, and (iii) the discard of data upon expiration of the access count.

In one embodiment, a prefetched cache line and the corresponding access count are stored in a data cache within the microprocessor. The stored access count is decremented upon access to the cache line in response to a memory operation. The data cache attempts to allocate storage for a cache miss in a manner which does not displace the prefetched cache line at least until the corresponding access count expires. The present embodiment may additionally include a victim cache for storing prefetched cache lines which are selected by the data cache for replacement prior to expiration of the corresponding access count. In this manner, subsequent memory operations which access the prefetched cache line may hit in the victim cache instead of requiring a fetch from main memory with the corresponding high memory latency.

Broadly speaking, the present invention contemplates a microprocessor configured to execute a prefetch instruction. The prefetch instruction includes an access count field. The microprocessor is configured to transfer a cache line identified by the prefetch instruction into the microprocessor and to preferentially retain the cache line until a number of accesses defined by the access count field are recorded via execution of subsequent instructions.

The present invention further contemplates a method for prefetching a cache line into a microprocessor. A prefetch instruction identifying the cache line is executed. The prefetch instruction includes an access count field defining an access count corresponding to the cache line. The cache line is transferred into the microprocessor responsive to the executing of the prefetch instruction. The access count is stored with the cache line and is decremented upon accessing the cache line.

The present invention still further contemplates a computer system comprising a microprocessor and a main memory. The microprocessor is configured to execute a prefetch instruction including an access count field. The microprocessor is configured to read a cache line identified by the prefetch instruction and to preferentially retain the cache line until a number of accesses defined by the access count field are recorded via execution of subsequent instructions. The main memory is coupled to provide the cache line to the microprocessor.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
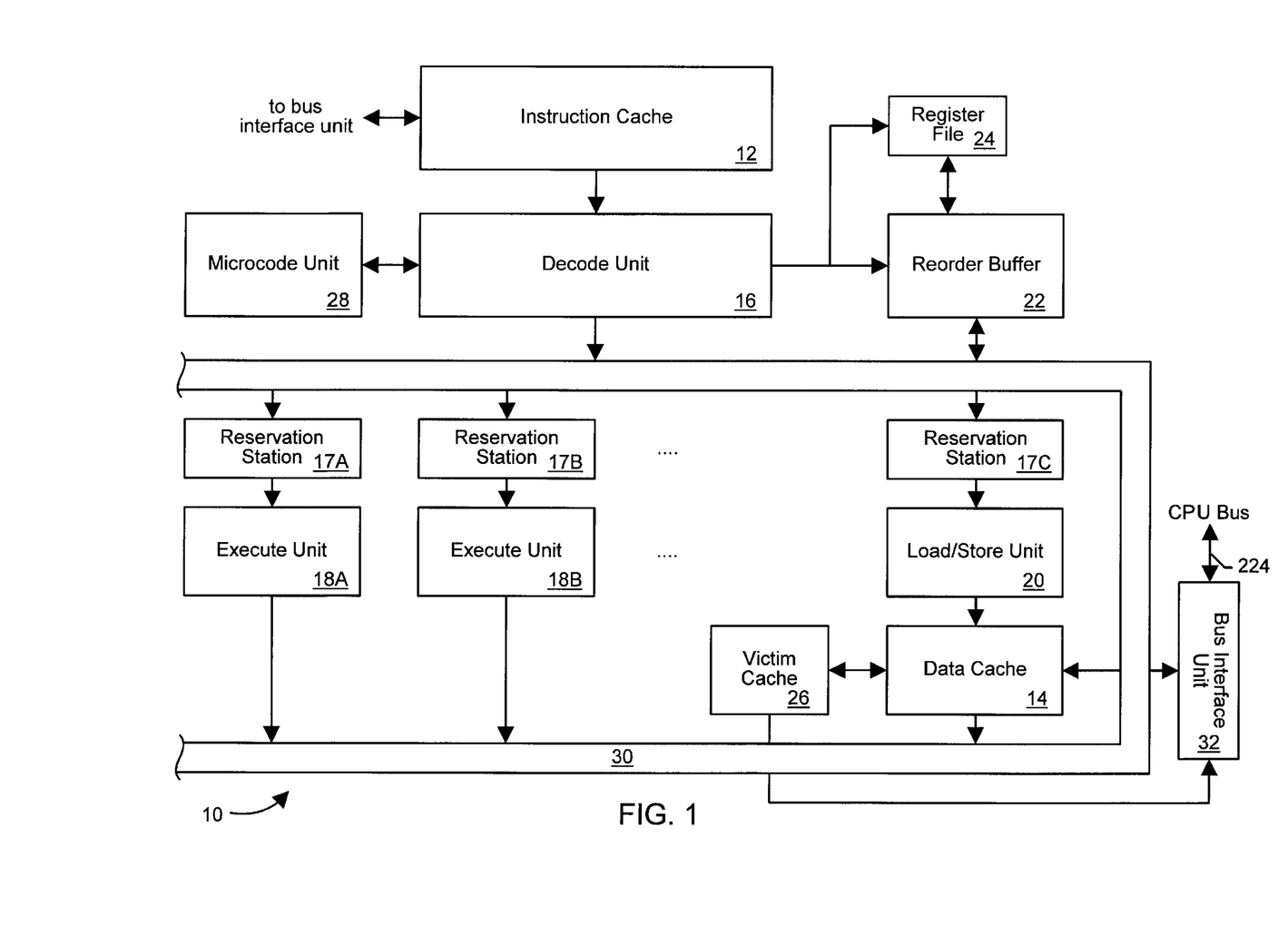
FIG. 1 is a block diagram of one embodiment of a microprocessor.

Turning now to FIG. 1, a block diagram of one embodiment of a microprocessor 10 is shown. Other embodiments are possible and contemplated. As shown in FIG. 1, microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a victim cache 26, a microcode unit 28, and a bus interface unit 32. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to bus interface unit 32 and to decode unit 16, which is further coupled to reservation stations 17, reorder buffer 22, register file 24, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to bus interface unit 32. Additionally, victim cache 26 is coupled to data cache 14 and bus interface unit 32. Bus interface unit 32 is coupled to a CPU bus 224

Generally speaking, microprocessor 10 is configured to execute a prefetch instruction. The prefetch instruction identifies a cache line to be fetched into data cache 14 and defines an access count which indicates the number of accesses expected to the cache line (e.g. the number of memory operations which are to be executed subsequent to the prefetch instruction which operate upon data within the cache line). Application developers/compilers may insert the prefetch instruction into a code sequence prior to the code which accesses the cache line. Since the application developer/compiler is aware of the number of accesses to the cache line by the subsequent code sequence (either as a constant or calculable from values available during execution of the code sequence), the number of accesses can be defined via the prefetch instruction. Microprocessor 10 attempts to retain the cache line until the specified number of accesses have been recorded, then may discard the cache line. Advantageously, microprocessor 10 is informed via the prefetch instruction of the expected number of accesses. Microprocessor 10 may then retain the cache line until then number of accesses occurs (potentially increasing cache hit rates), and may also be able to more accurately determine when the data is no longer needed (allowing for subsequent data to be brought into the cache to replace the data). Cache hit rates, and hence microprocessor performance, may be increased by retaining the data and by discarding the data according to the access count. Effectively, the access count may be viewed as defining a "life time" for the data, measured in terms of number of accesses, after which the data may no longer be required. Instead of waiting for replacement according to a standard replacement algorithm, the data may be replaced on the next cache miss for which the storage location storing the prefetched cache line is eligible.

As used herein, a "prefetch instruction" refers to an instruction within the instruction set (i.e. an instruction assigned a unique encoding among the other instructions within the instruction set) which is defined to cause a cache line to be read into data cache 14. The prefetch instruction may exclude a destination operand, such that the state of microprocessor 10 is unmodified other than the effects on the cache of loading the cache line. The cache line is identified by an address generated during execution of the prefetch instruction. One or more address operands of the prefetch instruction are used to generate the address. The prefetch instruction described herein also includes an access count field which defines an access count for the prefetched cache line. As used herein, "defining an access count" refers to either directly or indirectly determining the value for the access count. For example, the access count field may directly determine the access count by encoding an immediate value within the field which is then used as the access count. Alternatively, a register address may be coded in the access count field, indirectly specifying the access count as the value in the register. In yet another alternative, the access count may be stored in a memory location and the access count field may directly or indirectly specify the address of the memory location. Any suitable method for defining the access count may be used.

In one embodiment, data cache 14 is configured to store the access count corresponding to the prefetched cache line with that cache line. Load/store unit 20 executes the prefetch instruction and indicates, along with the address specified by the prefetch instruction, that a prefetch instruction is being executed. Additionally, load/store unit 20 provides the access count to data cache 14. If the prefetched cache line hits in data cache 14, the access count is stored with the cache line. Otherwise, the cache line is fetched from main memory via bus interface unit 32. Upon return of the cache line, the access count is stored with the cache line in data cache 14.

The stored access count is decremented each time an access to the cache line is received by data cache 14. Data cache 14 preferentially retains the cache line until the access count expires. For example, the access count may expire when the count reaches zero. As used herein, a cache line is "preferentially retained" if other cache lines than that cache line are selected for replacement upon detection of a cache miss even if that cache line would be selected according to a replacement algorithm employed by data cache 14. For example, a least recently used (LRU) algorithm may be employed in which the cache lines eligible for replacement by a missing cache line are ranked from most recently accessed to least recently accessed and the least recently accessed cache line is replaced upon a cache miss. A preferentially retained cache line is not selected for replacement, even if that cache line is least recently used, if at least one of the other eligible cache lines is selectable (i.e. not preferentially retained).

Microprocessor 10, in the embodiment of FIG. 1, additionally employs victim cache 26. A victim cache is used to store cache lines which are selected for replacement from data cache 14, instead of discarding the cache lines entirely. Accordingly, recently discarded cache lines may be available with low latency within the victim cache if the recently discarded cache lines are subsequently needed by the microprocessor. More particularly, data cache 14 is configured to move prefetched cache lines for which the corresponding access count has not expired to victim cache 26 when such a cache line is selected for replacement. The cache line may be selected for replacement if, for example, each of the cache lines eligible for replacement are prefetched cache lines with unexpired access counts. In this manner, prefetched cache lines may be retained for a period of time even if selected for replacement. Victim cache 26 may be configured, for example, as an N entry first-in, first-out (FIFO) buffer or a fully associative set of storage locations, for example.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation. A memory operation may be an implicit part of an instruction which performs an operation upon a memory operand, or may be the explicit operation of an instruction (i.e. the instruction performs data movement only). When an instruction includes a memory operation, one or more of the operands of the instruction are used to generate the address of the memory operation. These operands are referred to as "address operands" and may be register operands as well as immediate/displacement data from the instruction encoding itself.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. In other words, a cache line is a block of contiguous bytes which is allocated and deallocated from a cache as a unit.

Bus interface unit 32 effects communication between microprocessor 10 and devices coupled thereto via CPU bus 224. For example, instruction fetches which miss instruction cache 12 may be transferred from a main memory by bus interface unit 32. Similarly, data requests performed by load/store unit 20 which miss data cache 14 may be transferred from main memory by bus interface unit 32. Additionally, data cache 14 and/or victim cache 26 may discard a cache line of data which has been modified by microprocessor 10. Bus interface unit 32 transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
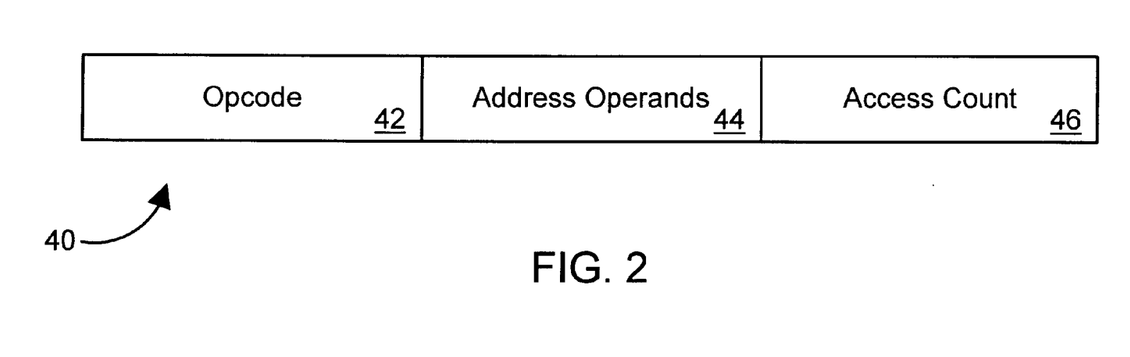
FIG. 2 is a block diagram of one embodiment of a prefetch instruction.

Turning next to FIG. 2, an exemplary prefetch instruction 40 is shown. Prefetch instruction 40 is one embodiment of a prefetch instruction which may be suitable for one embodiment of microprocessor 10. Other embodiments are possible and contemplated. As shown in FIG. 2, prefetch instruction 40 includes an opcode field 42, and address operands field 44, and an access count 46.

Opcode field 42 stores the opcode of the instruction, which identifies the prefetch instruction within the instruction set employed by microprocessor 10. In other words, one encoding of opcode field 42 identifies the prefetch instruction and other encodings identify other instructions within the instruction set.

Address operands field 44 includes one or more address operands identifying the address to be prefetched. The address operands may include one or more register addresses and/or a displacement field. The values stored in the specified registers (if any) and the displacement value (if any) are added together to generate the address of the prefetched cache line.

Access count field 46 defines the access count corresponding to the prefetched cache line. As mentioned above, access count field 46 may directly or indirectly define the access count using a variety of operand addressing modes. In one embodiment access count field 46 includes a three bit immediate field for specifying an access count of up to eight accesses. Alternatively, access count field 46 comprises a register address in another embodiment, wherein the register stores the access count. In yet another embodiment, access count field 46 comprises one or more address operands which specify a memory address at which the access count is stored.

As used herein, the term "field" refers to one or more bits within an entity which are logically grouped together and are interpreted to determine an attribute of that entity. For example, access count field 46 is a field within the prefetch instruction 40 entity.

Figure 3:
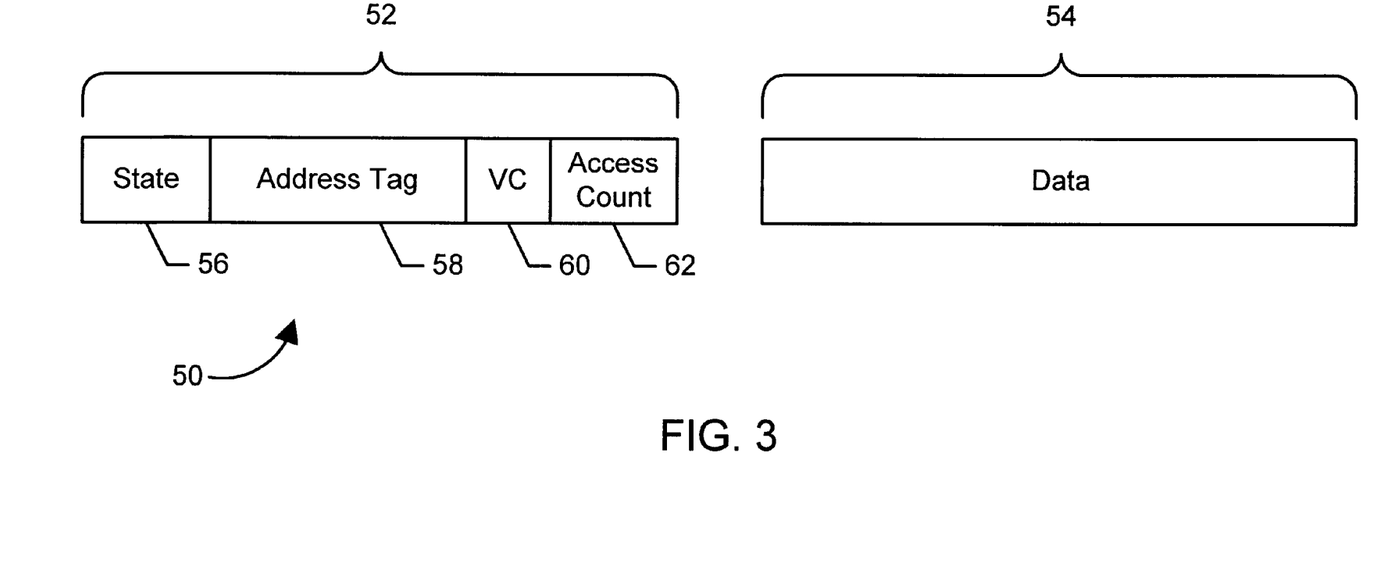
FIG. 3 is a block diagram of one embodiment of a data cache storage location.

Turning now to FIG. 3, an exemplary storage location 50 from one embodiment of data cache 14 is shown. Other embodiments are possible and contemplated. In the embodiment of FIG. 3, storage location 50 includes a tag portion 52 and a data portion 54. Tag portion 52 includes a state field 56, an address tag field 58, a valid count field 60, and an access count field 62. Data portion 54 is configured to store a cache line of data bytes.

State field 56 stores the state of the cache line. For example, data cache 14 may employ the MESI coherency scheme in which a cache line may be in one of four states: modified, exclusive, shared, and invalid. An invalid cache line is the same as a cache miss, and other states may be cache hits (although some bus activity may be needed, e.g., for a write memory operation to a shared cache line). The acronym MESI is derived from the first letter of the four possible states.

Address tag field 58 stores the tag portion of the address corresponding to the data bytes stored in data portion 54. The tag portion of the address excludes the offset portion (which identifies a byte within the contiguous bytes forming the cache line) and the index portion (which identifies a row of data cache 14 including one or more cache lines, the row comprising the cache line or lines eligible for storing data corresponding to an address having a particular index).

Valid count field 60 includes a validity indication for access count field 62. If valid count field 60 indicates that access count field 62 is valid, then the cache line stored in storage location 50 is a prefetched cache line stored into data cache 14 in response to a prefetch instruction. If access count field 62 is invalid, then the stored cache line is not the result of a prefetch instruction and access count field 62 is not storing a corresponding access count value. Data cache 14 validates the access count for prefetch instructions using valid count field 60, and indicates invalid using valid count field 60 for cache lines transferred from main memory in response to a cache miss by a memory operation. In one embodiment, valid count field 60 comprises a bit indicative, when set, that access count field 62 is valid and indicative, when clear, that access count field 62 is invalid.

Access count field 62 stores the access count corresponding to the cache line stored in storage location 50. Access count field 62 is initialized with the access count defined by the prefetch instruction. During each access by a memory operation, the access count is decremented (saturating at zero). When the access count is decremented to zero, the access count is expired and subsequent decrements do not affect the access count. Accordingly, if access count field 62 is storing zero and is indicated as valid by valid count field 60, then the cache line stored in storage location 50 may be replaced.

It is noted that storage locations within victim cache 26 may be configured similar to storage location 50.

Figure 4:
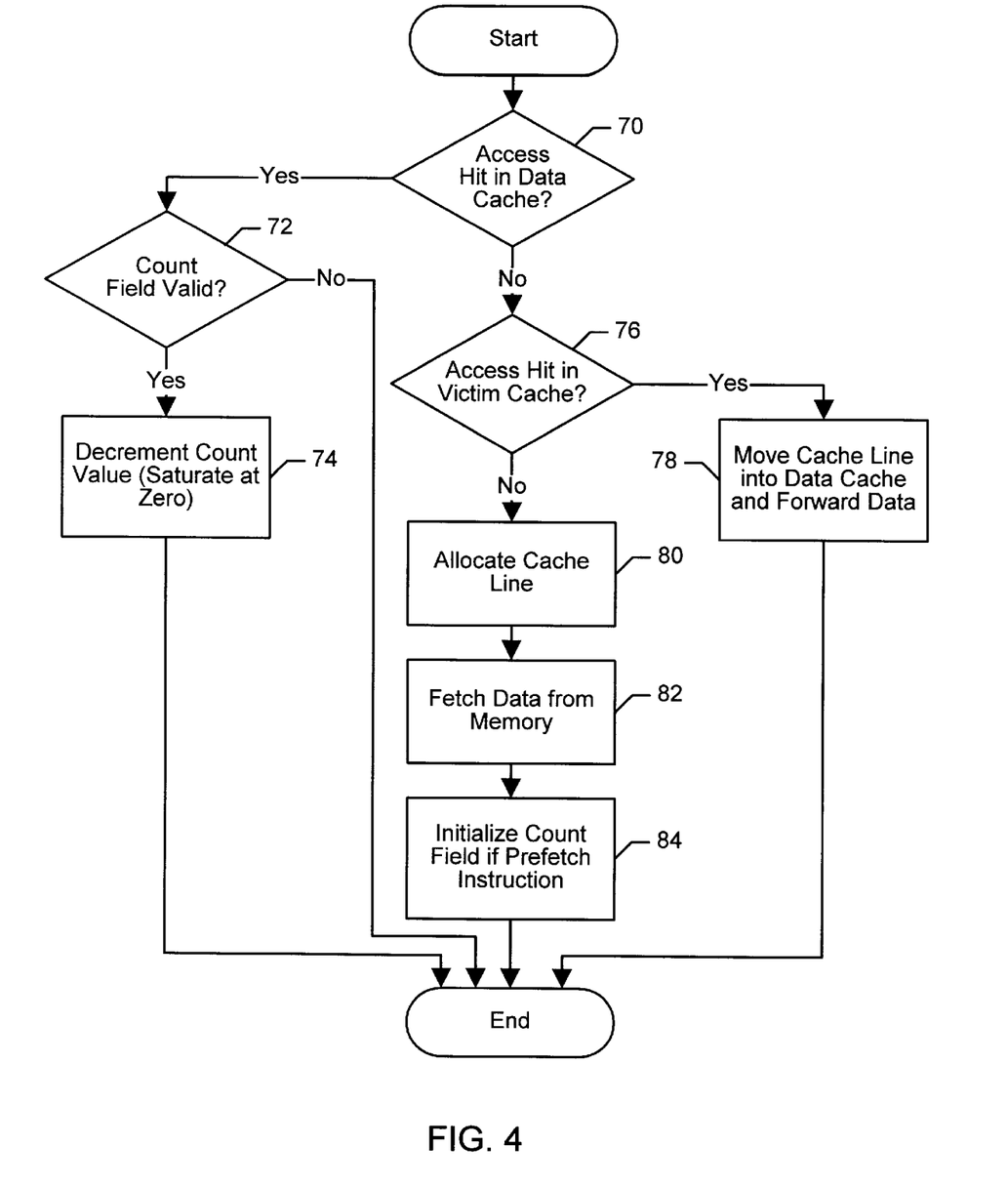
FIG. 4 is a flowchart illustrating operation of one embodiment of a data cache in response to an access performed in response to a memory operation.

Turning now to FIG. 4, a flowchart is shown illustrating operation of one embodiment of data cache 14 in response to an access by load/store unit 20 in response to a memory operation or a prefetch instruction. Other embodiments are possible and contemplated. The steps shown in FIG. 4 (and FIG. 5 below) are shown serially for ease of understanding. However, any suitable ordering of the steps may be used. Furthermore, the steps may be implemented in a parallel fashion by data cache 14.

Data cache 14 determines if the access is a hit (decision block 70). If the access is a hit, data cache 14 examines count valid field 60 (decision block 72). If count valid field indicates that the access count corresponding to the cache line is valid (i.e. that the cache line resides in data cache 14 as a result of a prefetch instruction), then data cache 14 decrements the access count stored in the access count field (step 74). If the access count is already zero, the decrement is effectively not performed (i.e. the access count saturates at a lower bound of zero). On the other hand, if the access count field is not valid, then no decrement is performed.

If the access is a miss in data cache 14, victim cache 26 is searched (decision block 76). If the access is a hit in victim cache 26, then data cache 14 moves the cache line back into data cache 14 (displacing a line stored therein in a manner similar to a cache miss in data cache 14). Additionally, the requested data is forwarded to reorder buffer 22 and reservation stations 17 and the access count of the hitting line is decremented (step 78).

Figure 5:
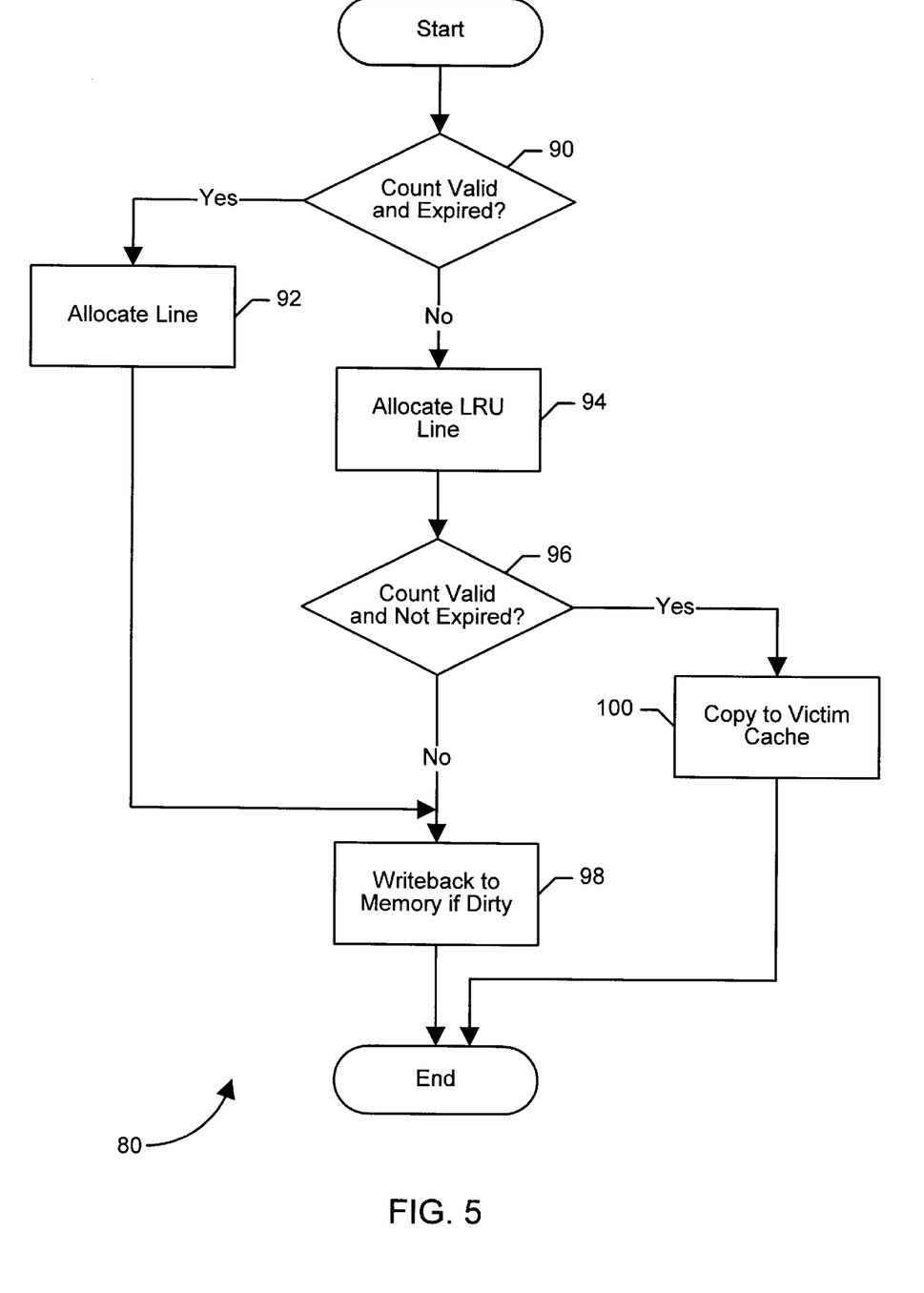
FIG. 5 is a flowchart illustrating one embodiment of an allocate cache line step shown in FIG. 4.

On the other hand, if an access is a miss in both data cache 14 and victim cache 26, data cache 14 allocates an eligible storage location to store the cache line (step 80). In one embodiment, the allocation of a cache line is performed as shown in FIG. 5. The missing cache line is fetched from memory (step 82). Additionally, if the cache miss is the result of a prefetch instruction, the access count field is initialized and the valid count field is set to valid (step 84). Otherwise, the valid count field is set to invalid.

Turning next to FIG. 5, a flowchart is shown illustrating allocation of a cache line (e.g. step 80 shown in FIG. 4) according to one embodiment of data cache 14. Other embodiments are possible and contemplated.

Data cache 14 checks the cache lines eligible for replacement in response to the missing cache line. If the count valid field corresponding to one of the eligible cache lines indicates that the access count is valid and the access count is expired, data cache 14 selects that cache line for replacement (decision block 90 and step 92). In this manner, cache lines for which a number of accesses is indicated are preferentially selected for replacement after the specified number of accesses are performed. If the allocated cache line is dirty (i.e. modified, in the MESI coherency encoding), then the cache line is written back to main memory (step 98).

On the other hand, if the access count is not valid or the access count is not expired for each eligible cache line, then a storage location is selected according to a modified LRU scheme. In the scheme, the least recently used eligible cache line having a valid count field indicating invalidity is selected if at least one eligible cache line has a valid count field indicating invalid. Otherwise, the least recently used cache line is selected (step 94). If the access count corresponding to the LRU cache line is valid and not expired (decision block 96), then the LRU cache line is copied to victim cache 26 (step 100). Otherwise, the LRU cache line is discarded (or copied back to main memory if dirty, as illustrated by step 98).

Figure 6:
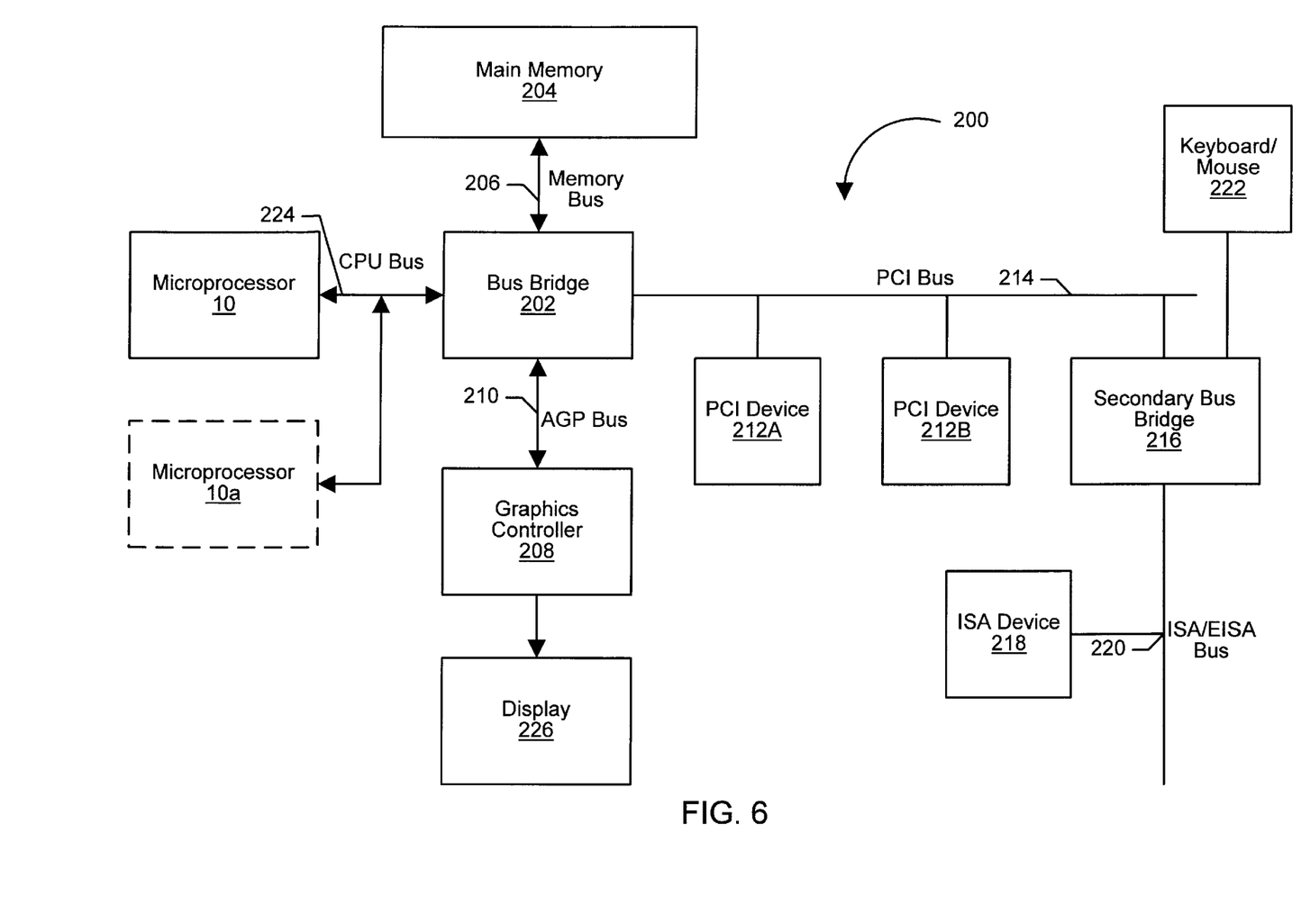
FIG. 6 is a block diagram of one embodiment of a computer system.

Turning now to FIG. 6, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 6) or may be connected to bus bridge 202 via an independent bus.

In accordance with the above disclosure, a microprocessor has been shown which is configured to execute a prefetch instruction. The prefetch instruction specifies a cache line to be prefetched as well as an access count indicating a number of accesses expected to the cache line. The microprocessor attempts to retain the cache line until at least the number of accesses specified by the access count are recorded. Advantageously, a "lifetime" for the data in the cache is specified, indicating not only if the cache line should be retained in the cache (access count not expired), but when the cache line can be removed from the cache (access count expired). Once the access count has expired, the cache line may be discarded. Advantageously, cache hit rates may be increased by the prefetch of data, as well as the discard of data after access is no longer expected.

Numerous variations and modifications will become apparent to those skilled in the art once the above disclosure is fully appreciated. It is intended that the following claims be interpreted to embrace all such variations and modifications.

What is claimed is:

1. A microprocessor configured to execute a prefetch instruction, said prefetch instruction including an access count field, said microprocessor configured to transfer a cache line identified by said prefetch instruction into said microprocessor and to preferentially retain said cache line until a number of accesses defined by said access count field are recorded via execution of subsequent instructions.

2. The microprocessor as recited in claim 1 comprising:
   a load/store unit configured to execute said prefetch instruction; and
   a data cache coupled to said load/store unit, wherein said data cache is configured to store said cache line.

3. The microprocessor as recited in claim 2 wherein said data cache is further configured to store said number of accesses with said cache line.

4. The microprocessor as recited in claim 3 wherein said load/store unit is further configured to execute a memory operation accessing said cache line.

5. The microprocessor as recited in claim 4 wherein said data cache is configured to decrement said number of accesses upon execution of said memory operation.

6. The microprocessor as recited in claim 5 wherein said data cache is configured to store a validity indication corresponding to said number of accesses, wherein said data cache is configured to set said validity indication to indicate valid in response to said cache line being stored into said data cache in response to said prefetch instruction.

7. The microprocessor as recited in claim 6 wherein said data cache is configured to inhibit decrementing said number of accesses if said validity indication indicates that said number of accesses is invalid.

8. The microprocessor as recited in claim 3 wherein said load/store unit is configured to execute a memory operation to a different cache line.

9. The microprocessor as recited in claim 8 wherein said data cache is configured to allocate storage for said different cache line upon detecting a miss for said different cache line.

10. The microprocessor as recited in claim 9 wherein said data cache is configured to select storage being used to store said cache line if said number of accesses is expired.

11. The microprocessor as recited in claim 10 further comprising a victim cache coupled to said data cache.

12. The microprocessor as recited in claim 11 wherein said data cache is configured to transfer said cache line to said victim cache if said storage being used to store said cache line is selected to store said different cache line and said number of accesses is not expired.

13. A method for prefetching a cache line into a microprocessor comprising:

executing a prefetch instruction identifying said cache line, said prefetch instruction including an access count field defining an access count corresponding to said cache line;

transferring said cache line into said microprocessor responsive to said executing;

storing said access count with said cache line; and decrementing said access count upon accessing said cache line.

14. The method as recited in claim 13 further comprising retaining said cache line within said microprocessor until said access count expires.

15. The method as recited in claim 14 further comprising preferentially selecting said cache line for replacement if said access count is expired.

16. The method as recited in claim 15 further comprising moving said cache line to a victim cache if said cache line is selected for replacement and said access count is not expired.

17. A computer system comprising:

a microprocessor configured to execute a prefetch instruction, said prefetch instruction including an access count field, said microprocessor configured to read a cache line identified by said prefetch instruction and to preferentially retain said cache line until a number of accesses defined by said access count field are recorded via execution of subsequent instructions; and a main memory coupled to provide said cache line to said microprocessor.

18. The computer system as recited in claim 17 further comprising a second microprocessor configured to execute said prefetch instruction, wherein said main memory is coupled to provide said cache line to said second microprocessor.

19. The computer system as recited in claim 17 further comprising:

a peripheral bus; and a bus bridge coupled between said main memory and said microprocessor and between said peripheral bus and said microprocessor, said bus bridge configured to provide communication between said microprocessor, said main memory, and said peripheral bus.

20. The computer system as recited in claim 19 further comprising a modem coupled to said peripheral bus.

* * * * *